(12) United States Patent
Yasuda et al.

(10) Patent No.: US 10,381,624 B2
(45) Date of Patent: Aug. 13, 2019

(54) COMPOSITION FOR SECONDARY BATTERY POROUS MEMBRANE, POROUS MEMBRANE FOR SECONDARY BATTERY AND SECONDARY BATTERY

(71) Applicant: ZEON CORPORATION, Chiyoda-ku, Tokyo (JP)

(72) Inventors: Naohiro Yasuda, Tokyo (JP); Yujiro Toyoda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 69 days.

(21) Appl. No.: 15/558,660

(22) PCT Filed: Mar. 30, 2016

(86) PCT No.: PCT/JP2016/001841
§ 371 (c)(1),
(2) Date: Sep. 15, 2017

(87) PCT Pub. No.: WO2016/157899
PCT Pub. Date: Oct. 6, 2016

(65) Prior Publication Data
US 2018/0114966 A1    Apr. 26, 2018

(30) Foreign Application Priority Data
Mar. 30, 2015    (JP) .................................. 2015-069898

(51) Int. Cl.
*C01F 7/02* (2006.01)
*H01M 2/16* (2006.01)
(Continued)

(52) U.S. Cl.
CPC .......... *H01M 2/166* (2013.01); *B01D 71/022* (2013.01); *C01F 7/02* (2013.01); *C01F 7/026* (2013.01);
(Continued)

(58) Field of Classification Search
None
See application file for complete search history.

(56) References Cited

U.S. PATENT DOCUMENTS 5,800,922 A * 9/1998 Anderson ................. C01F 7/02
423/625
6,312,619 B1 * 11/2001 Pope ....................... C01F 7/026
252/363.5
(Continued)

FOREIGN PATENT DOCUMENTS

JP    2010212046 A    9/2010
JP    2012004103 A    1/2012
(Continued)

OTHER PUBLICATIONS

Oct. 3, 2017, International Preliminary Report on Patentability issued in the International Patent Application No. PCT/JP2016/001841.
(Continued)

*Primary Examiner* — Jonathan Crepeau
(74) *Attorney, Agent, or Firm* — Kenja IP Law PC

(57) ABSTRACT

The purpose of the present disclosure is to provide a composition for a second battery porous membrane having an excellent redispersibility. The disclosed composition for a second battery porous membrane contains α-alumina-based modified particles, a particulate binder and water, and each α-alumina-based modified particle has a peak in a region from 3500 cm$^{-1}$ to 3600 cm$^{-1}$ in an infrared diffuse reflectance spectrometry.

9 Claims, 3 Drawing Sheets

(51) Int. Cl.
*B01D 71/02* (2006.01)
*H01M 2/14* (2006.01)
*H01M 10/0525* (2010.01)
*H01M 10/42* (2006.01)

(52) U.S. Cl.
CPC ......... *H01M 2/145* (2013.01); *H01M 2/1686* (2013.01); *H01M 10/0525* (2013.01); *H01M 10/4235* (2013.01)

(56) References Cited

U.S. PATENT DOCUMENTS

| 2010/0173187 A1 | 7/2010 | Nishikawa et al. |
| 2011/0206963 A1 | 8/2011 | Fujita et al. |
| 2015/0203686 A1* | 7/2015 | Ozaki ................... H01M 2/145 106/286.5 |

FOREIGN PATENT DOCUMENTS

| JP | 2013145763 A | 7/2013 |
| JP | 2014229406 A | 12/2014 |
| WO | 2008156033 A1 | 12/2008 |
| WO | 2010098497 A1 | 9/2010 |
| WO | 2015008673 A1 | 1/2015 |
| WO | 2018088004 A1 | 5/2018 |

OTHER PUBLICATIONS

Sep. 24, 2018, the Extended European Search Report issued by the European Patent Office in the corresponding European Patent Application No. 16771786.7.

Apr. 10, 2019, Communication pursuant to Article 94(3) EPC issued by the European Patent Office in the corresponding European Patent Application No. 16771786.7.

* cited by examiner

COMPOSITION FOR SECONDARY BATTERY POROUS MEMBRANE, POROUS MEMBRANE FOR SECONDARY BATTERY AND SECONDARY BATTERY

TECHNICAL FIELD

The present disclosure relates to a composition for a secondary battery porous membrane, a porous membrane for a secondary battery and a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as electrodes (a positive electrode and a negative electrode) and a separator that isolates the positive electrode and the negative electrode from one another and prevents short-circuiting between the positive and negative electrodes.

In recent years, battery members that have, as a protective layer, a porous membrane for increasing heat resistance and strength have been used.

Specifically, examples of porous membrane include those formed by bonding inorganic particles by a binder. Such a porous membrane is normally formed by preparing a slurry composition (hereinafter also referred to as "a composition for a porous membrane") formed by dispersing inorganic particles and a binder in a dispersion medium such as water, applying the composition for a porous membrane on an electrode substrate formed by providing an electrode mixed material layer on a current collector or a separator substrate, and drying the composition.

Extensive improvements have been made on porous membranes in an aim to achieve higher performance of secondary batteries. For example, attempts have been made to improve a battery performance by changing properties and materials of inorganic particles in a porous membrane (see, for example, PTL1 and PTL2).

PTL 1 reports that, a porous membrane that has an optimal porosity, an excellent uniformity and a thermal stability can be formed by using, as inorganic particles, inorganic oxide particles such as α-alumina having specific properties.

PTL 2 discloses that metal hydroxide such as aluminum hydroxide that causes dehydration at a specific temperature is used as inorganic particles, and reports that a separator comprising a porous membrane that contains such metal hydroxide exhibits an excellent heat resistance, shutdown function, flame retardancy and handleability.

CITATION LIST

Patent Literature

PTL 1: JP2012-004103 A
PTL 2: WO2008/156033

SUMMARY

Technical Problem

A problem in which solid matters such as inorganic particles contained in a composition for a porous membrane are aggregated during storage of such composition has been conventionally known. Thus, a composition for a porous membrane is subjected to redispersion treatment as necessary right before it is applied onto a substrate such as an electrode substrate or a separator substrate.

However, it has been difficult to secure a sufficient dispersibility of a composite for a porous membrane even if the composition for a porous membrane containing inorganic particles according to the aforementioned conventional technique is subjected to redispersion treatment after its storage for a long period of time. Thus, a homogeneous porous membrane has not been obtained even with the use of the aforementioned conventional technique. Further, such porous membrane has less adhesiveness (peel strength) to a substrate, and thus could not allow a secondary battery to exhibit excellent cycle characteristics.

It is therefore an object of the present disclosure to advantageously solve the aforementioned improvement.

Solution to Problem

The inventor conducted diligent investigation with the aim of solving the problem set forth above. The inventor has found that a composition for a porous membrane with an excellent redispersibility can be prepared by using, as inorganic particles, particles that contain α-alumina and have a characteristic peak that is not observed by particles composed substantially only of α-alumina in a specific range of infrared diffusion reflection spectrum (hereinafter referred to as "α-alumina-based modified particles"), and a porous membrane obtained by using the composition for a porous membrane has an excellent peel strength and allows a secondary battery to exhibit excellent cycle characteristics, and has completed the present disclosure.

It would therefore be helpful to advantageously solve the aforementioned problem, and the disclosed composition for a secondary battery porous membrane contains α-alumina-based modified particles, a particulate binder and water, and each of the aforementioned α-alumina-based modified particles has a peak in a region from 3500 cm$^{-1}$ to 3600 cm$^{-1}$ in an infrared diffuse reflection spectrometry. As described above, a composition for a porous membrane that employs the aforementioned specific α-alumina-based modified particles as inorganic particles exhibits an excellent redispersibility. Further, a porous membrane obtained by using the composition for a porous membrane exhibits an excellent peel strength, and allows a secondary battery to exhibit excellent cycle characteristics.

Note that, in the present disclosure, the "infrared diffusion reflection spectrometry" can be performed by the method described in the Examples of the present specification.

In the disclosed composition for a secondary battery porous membrane, it is preferable that a moisture generation rate curve obtained through the evolved gas mass spectrometry of the α-alumina-based modified particles under the conditions of α-alumina-based modified particle mass: 20 mg, temperature rising rate: 20° C./min. and measurement temperature range: 20° C. to 1000° C. has a maximum moisture generation rate value, $W_{max}$, within the range from at least 200° C. to no higher than 260° C.; and the moisture generation amount X near $W_{max}$ calculated from the region surrounded by the base line connecting the point of 200° C. and the point of 260° C. on the moisture generation rate curve and the moisture generation rate curve is at least 15 mass ppm and no greater than 18000 mass ppm. When the α-alumina-based modified particles having the moisture generation amount X near $W_{max}$ of at least 15 mass ppm and no greater than 18000 mass ppm is used, the amount of water imported into a secondary battery is reduced while the redispersibility of the composition for a porous membrane is further improved, and thus the peel strength of the porous membrane and the cycle characteristics of the secondary battery can be further improved.

To be more specific, in the present disclosure, the "evolved gas mass spectrometry" can be performed by the method described in the Examples of the present specification, and the "moisture generation amount X near $W_{max}$" can be derived from the method described in the Examples of the present specification.

Further, in the disclosed composition for a secondary battery porous membrane, the specific surface area of α-alumina-based modified particle is preferably at least 1 m²/g and no greater than 20 m²/g. When the α-alumina-based modified particle having a specific surface area of at least 1 m²/g and no greater than 20 m²/g is used, the peel strength of the porous membrane and the cycle characteristics of the secondary battery can be further improved while the redispersibility of the composition for a porous membrane is further improved.

Note that, in the present disclosure, the "specific surface area" can be obtained through the BET method, and specifically, through the method described in the Examples of the present specification.

Furthermore, in the disclosed composition for a secondary battery porous membrane, the proportion of the α-alumina-based modified particles in the total solid content is preferably at least 50 mass %. When the proportion of the α-alumina-based modified particles in the total solid content is at least 50 mass %, the heat resistance of the resultant porous membrane is secured. Further, a particulate binder allows α-alumina-based modified particles to be bonded satisfactory each other and α-alumina-based modified particles and a substrate to be bonded satisfactory, and thus the peel strength of the porous membrane can be further increased.

In the disclosed composition for a secondary battery porous membrane, the particulate binder preferably includes an acid group-containing monomer unit. The particulate binder that includes an acid group-containing monomer unit has an excellent binding ability, and use of the particulate binder can further increase the peel strength of a porous membrane and the cycle characteristics of a secondary battery.

The phrase "includes a monomer unit" as used herein means that "a polymer obtained with the monomer includes a structural unit derived from the monomer."

In the disclosed composition for a secondary battery porous membrane, the particulate binder preferably includes a crosslinkable monomer unit. A particulate binder that includes a crosslinkable monomer unit is less likely to be dissolved in an electrolysis solution, and when such particulate binder is used, the cycle characteristics of a secondary battery can be further increased.

The disclosed composition for a secondary battery porous membrane preferably further includes a dispersant. When the composition for a porous membrane includes a dispersant, the dispersion ability of the α-alumina-based modified particles is increased, and the redispersibility of the composition for a porous membrane can be further improved.

Furthermore, the disclosed composition for a secondary battery porous membrane preferably further includes a thickener. If the composition for a porous membrane includes a thickener, the thermal contraction of a porous membrane obtained by using the composition for a porous membrane can be further reduced.

The disclosed composition for a secondary battery porous membrane preferably further includes a wetting agent. If the composition for a porous membrane includes a wetting agent, the wettability of the composition for a porous membrane with a substrate is secured, and generation of cissing can be suppressed.

Further, the present disclosure aims to advantageously solve the aforementioned problem. The disclosed porous membrane for a secondary battery is formed by the aforementioned composition for a secondary battery porous membrane. The porous membrane has an excellent peel strength, and allows a secondary battery to exhibit excellent cycle characteristics.

The present disclosure also aims to advantageously solve the aforementioned problem, and the disclosed secondary battery has the aforementioned porous membrane for a secondary battery. The secondary battery has excellent cell characteristics such as cycle characteristics.

Advantageous Effect

According to the present disclosure, a composition for a secondary battery porous membrane having an excellent redispersibility can be provided.

Further, according to the present disclosure, a porous membrane for a secondary battery that has an excellent peel strength and allows a secondary battery to exhibit excellent cycle characteristics can be provided.

Also, according to the present disclosure, a secondary battery having excellent cycle characteristics can be provided.

DETAILED DESCRIPTION

Embodiments of the present disclosure will now be described in detail.

The disclosed composition for a secondary battery porous membrane is used as a material for preparing the disclosed porous membrane for a secondary battery. The disclosed porous membrane for a secondary battery is prepared by using the disclosed composition for a secondary battery porous membrane and constitutes a part of a separator, for example. Further, the disclosed secondary battery has at least the disclosed porous membrane for a secondary battery.

(Composition for Secondary Battery Porous Membrane)

The disclosed composition for a secondary battery porous membrane is a slurry composition in which water serves as a dispersion medium. The disclosed composition for a secondary battery porous membrane contains inorganic particles and a particulate binder and optionally further contains an additive. In the disclosed composition for a secondary battery porous membrane, the inorganic particles contain α-alumina-based modified particles having a characteristic peak in the region from 3500 cm$^{-1}$ to 3600 cm$^{-1}$ in an infrared diffusion reflection spectrometry.

Further, the disclosed composition for a secondary battery porous membrane employs, as inorganic particles, the aforementioned α-alumina-based modified particles specified by the infrared diffuse reflection spectrometry, and thus has an excellent redispersibility. A porous membrane formed by using the composition for a porous membrane after redispersion has an excellent peel strength and allows a secondary battery to exhibit an excellent cycle characteristics as well.

<α-Alumina-Based Modified Particles>

The α-alumina-based modified particles used for the disclosed composition for a secondary battery porous membrane has a peak in the region from 3500 cm$^{-1}$ to 3600 cm$^{-1}$ in an infrared diffusion reflection spectrometry.

[Infrared Diffusion Reflection Spectrometry]

Figure 1:
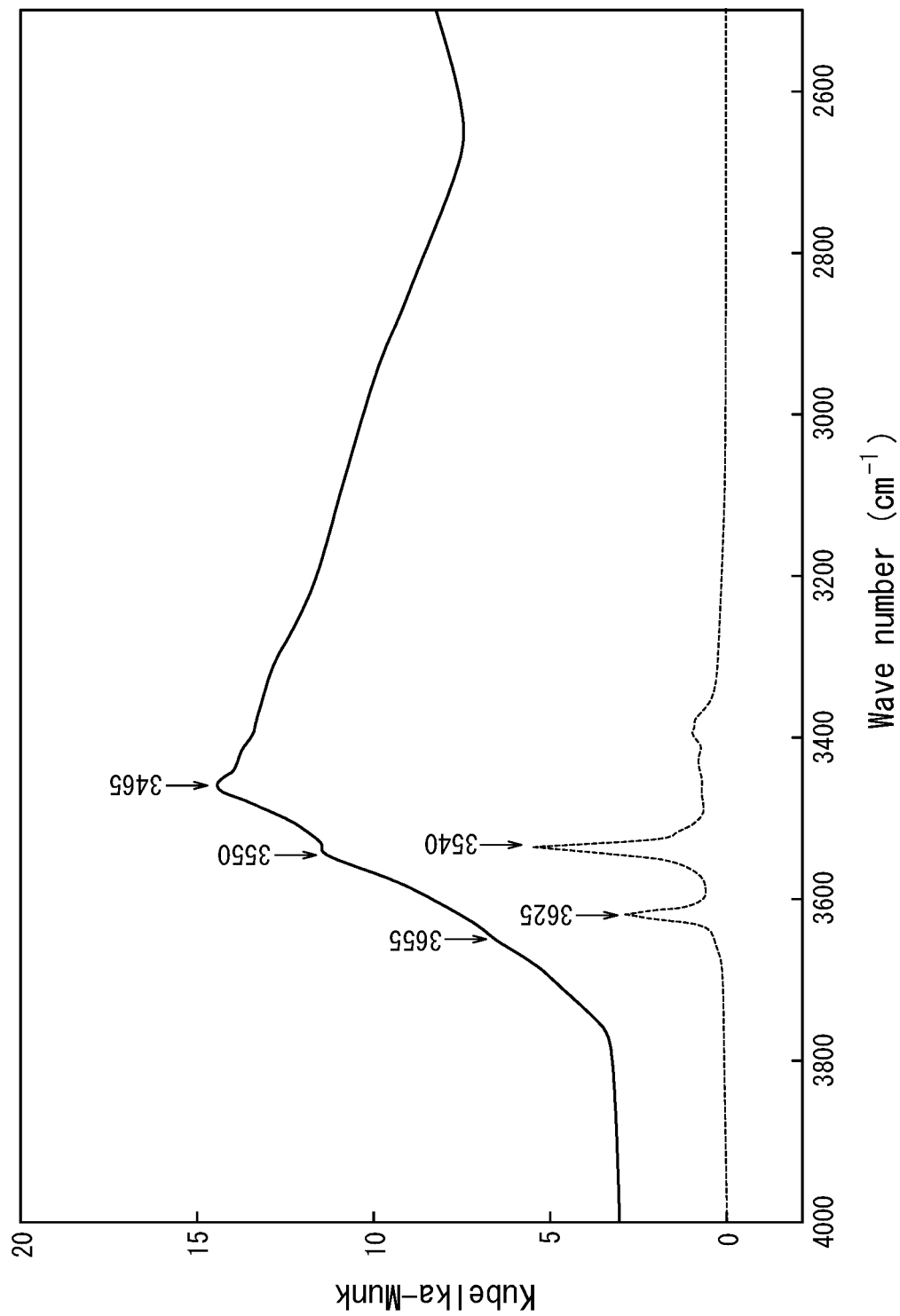
FIG. 1 is an example of the results of an infrared diffuse reflection spectrometry of α-alumina-based modified particles at a temperature of 20° C., which is illustrated by a solid line.

FIG. 1 illustrates an example of the results of infrared diffusion reflection spectrometry of α-alumina-based modified particles at a temperature of 20° C. The α-alumina-based modified particles are obtained by subjecting α-alumina particles to saturated water vapor treatment by the method described in Example 1 of the present specification.

In this example, the spectrum of the α-alumina-based modified particles (solid line) exhibits a shoulder-like peak at 3550 cm$^{-1}$. This peak is thought to correspond to a maximum peak derived from Al—OH of aluminum hydroxide appeared at 3540 cm$^{-1}$ of a spectrum (dashed line) of the aluminum hydroxide particles (proportion of aluminum hydroxide is 99.6 mass %) illustrated in FIG. 1. Further, the spectrum of the α-alumina-based modified particles (solid line) has also a relatively small shoulder-like peak at 3655 cm$^{-1}$, and this peak is also thought to correspond to the peak derived from Al—OH appeared at 3625 cm$^{-1}$ of the spectrum of the aluminum hydroxide particles (dashed like). Note that, when the infrared diffusion reflection spectrometry of the α-alumina particles was performed, no peak corresponding to any one of the aforementioned two peaks was found with the obtained spectrum (not illustrated).

The maximum peak appeared at 3465 cm$^{-1}$ of the spectrum of the α-alumina-based modified particles (solid line) is thought to be O—H stretching vibration peak caused by the water adsorbed to the α-alumina remained on the surface. A peak corresponding to the aforementioned peak cannot be found with the spectrum of the aluminum hydroxide particles (dashed line).

Therefore, according to the inventor, the α-alumina-based modified particle is presumed to be a particle in which α-alumina is contained and aluminum hydroxide is present on at least a part of the surface of the particle, and to be different from both of the α-alumina particle formed by the α-alumina described in PTL 1 and the aluminum hydroxide particle formed by the aluminum hydroxide described in PTL 2.

While the reason why the redispersibility of the composition for a porous membrane is increased by using such α-alumina-based modified particles is unclear, the following reason can be considered. That is, if a moderate amount of aluminum hydroxide is present on the surface of each particle, α-alumina-based modified particles repel each other to a certain extent according to their charge in water. Thus, it is presumed that, even if aggregates formed by solid contents such as α-alumina-based modified particles and particulate binder, or the like, occur during storage of a composition for a porous membrane over a long period of time, these solid contents can be separated easily through redispersion treatment.

[Evolved Gas Mass Spectrometry]

Figure 2:
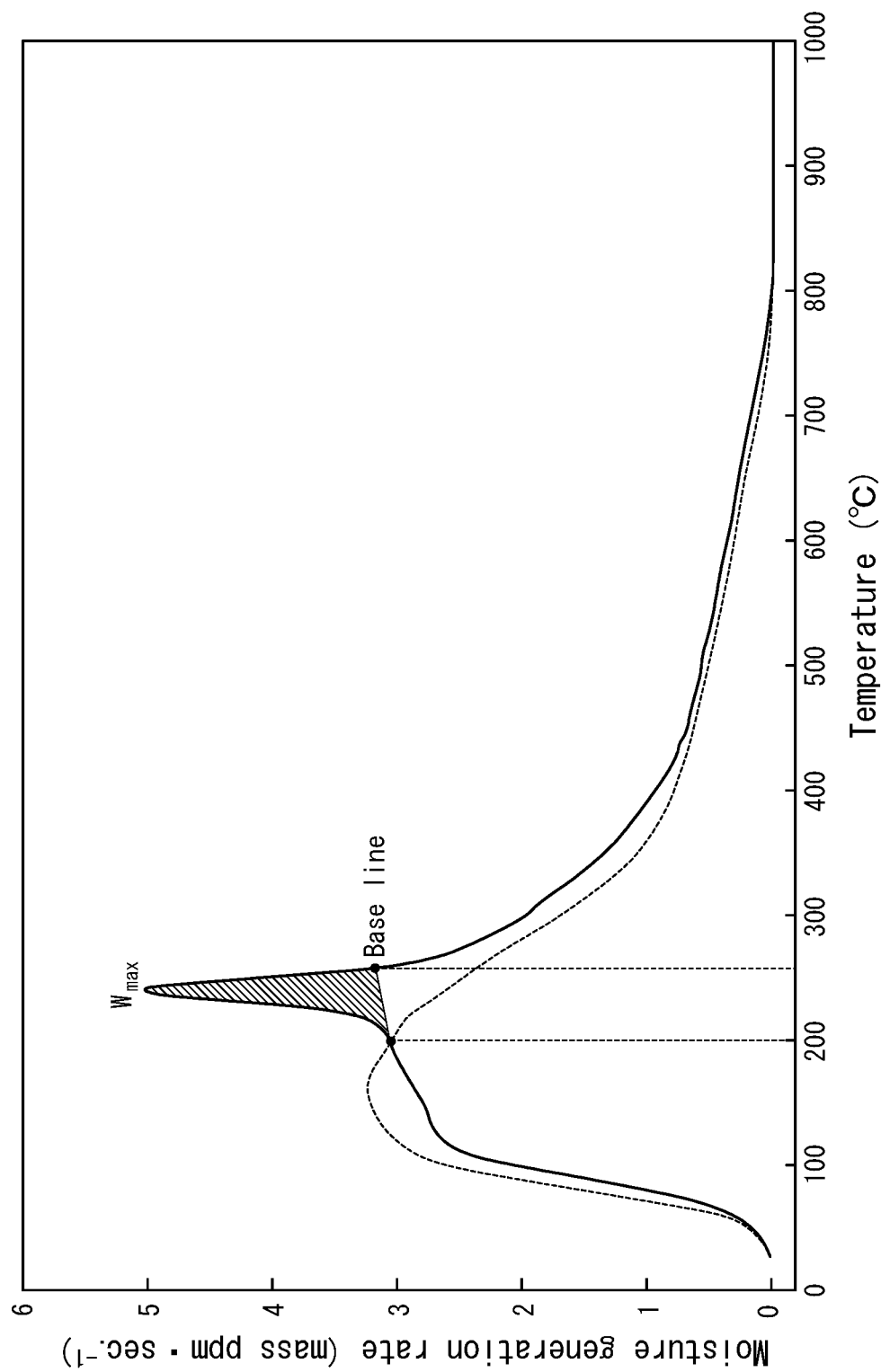
FIG. 2 is an example of the results of the evolved gas mass spectrometry of α-alumina-based modified particles illustrates by an solid line.

FIG. 2 illustrates an example of the results of evolved gas mass spectrometry of α-alumina-based modified particles (same particles as those used by the aforementioned infrared diffuse reflection spectrometry). The evolved gas mass spectrometry was performed under the conditions of α-alumina-based modified particle mass: 20 mg, temperature rising rate: 20° C./min., and measurement temperature range: 20° C. to 1000° C.

In this example, the moisture generation rate curve (solid line) of the α-alumina-based modified particles has a peak (a maximum value $W_{max}$ of moisture generation rate) at around a temperature of 240° C., which is not observed with the moisture generation rate curve (dashed line) of the α-alumina particles described in FIG. 2. This sharp peak appeared in the range from at least 200° C. to no higher than 260° C. is presumed to be derived from desorption of OH group and its adsorbed water from aluminum hydroxide present on the surface of the α-alumina-based modified particles.

Further, the amount of aluminum hydroxide contained in an α-alumina-based modified particle can be estimated based on the results of the evolved gas mass spectrometry. Specifically, the amount of aluminum hydroxide in an α-alumina-based modified particle can be estimated by deriving the moisture generation amount X near $W_{max}$ (hereinafter may simply be referred to as "moisture generation amount X") corresponding to the region (shaded area in FIG. 2) surrounded by the baseline connecting the point of 200° C. and the point of 260° C. on the moisture generation rate curve and the curve including the aforementioned $W_{max}$ of the moisture generation rate curve. That is, the moisture generation amount X can be a value correlated with the amount of aluminum hydroxide contained in an α-alumina-based modified particle.

The moisture generation amount X is preferably at least 15 mass ppm, more preferably at least 30 mass ppm, even more preferably at least 45 mass ppm, and particularly preferably at least 75 mass ppm, and preferably no greater than 18000 mass ppm, more preferably no greater than 15000 mass ppm, even more preferably no greater than 5000 mass ppm, further preferably no greater than 1500 mass ppm, particularly preferably no greater than 600 mass ppm and the most preferably no greater than 500 mass ppm. If the moisture generation amount X is at least 15 mass ppm, the redispersibility of the composition for a porous membrane can be further increased, and the peel strength of the porous membrane and the cycle characteristics of the secondary battery can be further improved. On the other hand, if the moisture generation amount X is no greater than 18000 mass ppm, reduction in the redispersibility caused by an excessive increase in the amount of aluminum hydroxide contained in an α-alumina-based modified particle is suppressed, and the amount of water imported into a secondary battery is reduced. Consequently, the cycle characteristics of a secondary battery can be further improved while the peel strength of the porous membrane is increased.

Note that, the moisture generation amount X near $W_{max}$ can be adjusted by changing the preparation conditions of the α-alumina-based modified particles. For example, when the α-alumina-based modified particles are prepared by exposing α-alumina particles in the water vapor, the moisture generation amount X near $W_{max}$ can be increased by exposing α-alumina particles for a longer period of time in the water vapor, and the moisture generation amount X near $W_{max}$ can be reduced by exposing the particles for a shorter period of time.

[Specific Surface Area]

The specific surface area of an α-alumina-based modified particle is preferably at least 1 m$^2$/g, more preferably at least 2 m$^2$/g, further preferably at least 3 m$^2$/g, particularly preferably at least 4 m$^2$/g, and most preferably at least 5 m$^2$/g, and preferably no greater than 20 m$^2$/g, more preferably no greater than 15 m$^2$/g, further preferably no greater than 10 m$^2$/g, particularly preferably no greater than 9 m$^2$/g, and most preferably no greater than 8 m$^2$/g. If the specific surface area of an α-alumina-based modified particle is at least 1 m$^2$/g, the particle size of α-alumina-based modified particle does not increase excessively, and close adherence between the particles or between the particle and the substrate is secured. Consequently, the peel strength of a porous membrane is further increased and the cycle characteristics of a secondary battery can be further improved. On the other hand, if the specific surface area of an α-alumina-based modified particle is no greater than 20 m$^2$/g, a particulate binder can bind sufficiently on the surface of α-alumina-based modified particle. Consequently, the peel strength of a porous membrane is further increased and the cycle characteristics of a secondary battery can be further improved. Furthermore, if the specific surface area of an α-alumina-based modified particle is no greater than 20 m$^2$/g, the redispersibility of the composition for a secondary battery porous membrane can be further increased since the amount of aluminum hydroxide present per unit area of the surface of the particle is sufficiently secured.

[Volume Average Particle Size]

The volume-average particle size of α-alumina-based modified particle is preferably at least 0.1 μm, more preferably at least 0.2 μm, further preferably at least 0.3 μm and particularly preferably at least 0.4 μm, and preferably no greater than 5 μm, more preferably no greater than 3 μm, further preferably no greater than 2 μm and particularly preferably no greater than 1 μm. If the volume-average particle size of α-alumina-based modified particle is at least 0.1 μm, the permeability of the porous membrane is secured and the amount of water imported into a secondary battery is reduced without an excessive increase in the bulk density of the particle. Further, the particulate binder and the α-alumina-based modified particles are arranged evenly in the porous membrane, and thus the peel strength of a porous membrane can be further improved. On the other hand, if the volume-average particle size of α-alumina-based modified particle is no greater than 5 μm, the heat resistance and the peel strength of a porous membrane can be secured without an excessive decrease in the bulk density.

Note that, in the present disclosure, the "volume-average particle size of α-alumina-based modified particle" refers to a particle size (D50) at which, in a particle size distribution (volume basis) measured by laser diffraction, the cumulative volume calculated from a small diameter side reaches 50%.

[Preparation of α-Alumina-Based Modified Particles]

Preparation methods of α-alumina-based modified particles having a specific peak in the aforementioned infrared diffusion reflection spectrometry are not particularly limited. Such α-alumina-based modified particles can be obtained by exposing α-alumina particles in the water vapor, for example. The conditions are not particularly limited, and can be appropriately adjusted according to the properties of the desired α-alumina-based modified particles. For example, when an α-alumina particle is exposed in the water vapor of 100° C. for a duration from 3 minutes to 3 hours, an α-alumina-based modified particle that contains unmodified α-alumina as a residue and has aluminum hydroxide generated on at least a part of the surface of the particle can be easily prepared.

Further, it is also possible to prepare an α-alumina-based modified particle in which α-alumina is contained and aluminum hydroxide is present on at least a part of the surface of the particle by subjecting an aluminum hydroxide particle to a dehydration reaction under the condition in which aluminum hydroxide remains at least a part of the surface, or by subjecting an α-alumina particle to pulverizing processing in a medium that contains a specific amount of water.

[Amount]

The amount of α-alumina-based modified particles contained in the disclosed composition for a secondary battery porous membrane is not particularly limited, and provided that the total solid content in the composition for a porous membrane is 100 mass %, the amount is preferably at least 50 mass %, more preferably at least 70 mass %, further preferably at least 80 mass % and particularly preferably at least 90 mass %. If the proportion of the α-alumina-based modified particles contained in the total solid content of the composition for a porous membrane is at least 50 mass %, the heat resistance of the resultant porous membrane can be ensured. Note that the proportion of α-alumina-based modified particles contained in the total solid content of the composition for a porous membrane is not particularly limited. It is normally no greater than 99 mass % in view of ensuring the amount of particulate binder.

<Particulate Binder>

Any binder can be used as the particulate binder contained in the disclosed composition for a secondary battery porous membrane as long as it is a water-insoluble binder, and examples of such binder includes a known particulate binder (particulate polymer) such as thermoplastic elastomers. The thermoplastic elastomer is preferably a conjugated diene-based polymer or an acrylicpolymer, and is more preferably an acrylic-based polymer.

One of such particulate binders may be used individually, or two or more of such binders may be used in combination.

Conjugated diene based polymer refers to a polymer that contains conjugated diene monomer unit. Examples of conjugated diene monomers that may form a conjugated diene monomer unit include aliphatic conjugated diene monomer such as 1,3-butadiene, 2-methyl-1,3-butadiene (isoprene), 2,3-dimethyl-1,3-butadiene, 2-chloro-1,3-butadiene (chloroprene), substituted linear conjugated pentadiene, and substituted and side-chain conjugated hexadiene. One of these monomers may be used individually, or two or more of these monomers may be used in combination. Further, the conjugated diene monomer unit may be hydrogenated. That is, the conjugated diene monomer unit includes a structural unit (hydrogenated conjugated diene unit) obtained through hydrogenation of a conjugated diene monomer unit.

Specific examples of conjugated diene based polymer are not particularly limited, and include aromatic vinyl monomer unit such as styrene-butadiene copolymer (SBR) and copolymer that contains aliphatic conjugated diene monomer unit, butadiene rubber (BR), acrylic rubber (NBR) (copolymer containing acrylonitrile unit and butadiene unit) and their hydride.

The acrylic polymer is a polymer that contains a (meth) acrylic acid ester monomer unit. As a (meth) acrylic acid ester monomer that can form a (meth) acrylic acid ester monomer unit, (meth) acrylic acid alkyl ester such as methyl acrylate, ethyl acrylate, butyl acrylate, methyl methacrylate, ethyl methacrylate and 2-ethylhexyl acrylate can be used. In the present disclosure, "(meth) acryl" is used to indicate "acryl" and/or "methacryl". One of them may be used individually, or two or more of them may be used in combination.

The proportion of (meth) acrylic acid ester monomer unit contained in acrylic-based polymer is not particularly limited, and is preferably at least 80 mass % and no greater than 96 mass %.

It is further preferable that the acrylic-based polymer contains a (meth) acrylonitrile monomer unit. If acrylic-based polymer contains a (meth) acrylonitrile monomer unit, the strength of the porous membrane can be increased. Note that, in the present disclosure, the "(meth) acrylonitrile" indicates acrylonitrile and/or methacrylonitrile. One of these (meth) acrylic acid ester monomers may be used individually, or two or more of these (meth) acrylic acid ester monomers may be used in combination.

The proportion of (meth) acrylonitrile monomer unit contained in acrylic-based polymer is preferably at least 0.1 mass % and no greater than 5 mass %.

The particulate binder preferably contains an acid group-containing monomer unit. If the particulate binder contains the acid group-containing monomer unit, the binding ability of the particulate binder is increased. Consequently, the peel strength of the porous membrane and the cycle characteristics of the secondary battery can be further improved.

Note that the "acid group-containing monomer unit" indicates a structural unit having a structure formed by polymerizing an acid group-containing monomer. Moreover, the "acid group-containing monomer" is a monomer that contains an acid group.

Examples of acid group-containing monomers that can form an acid group-containing monomer unit include carboxylic acid group-containing monomers, sulfonic acid group-containing monomers, and phosphate group-containing monomers.

Examples of monomers having a carboxylic acid group include monocarboxylic acid, derivatives of monocarboxylic acid, dicarboxylic acid, acid anhydrides of dicarboxylic acid, and derivatives of dicarboxylic acid.

Examples of monocarboxylic acid include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, α-chloro-β-E-methoxy acrylic acid, and β-diamino acrylic acid.

Examples of dicarboxylic acid include maleic acid, fumaric acid, and itaconic acid.

Examples of derivatives of dicarboxylic acid include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a mononer having a carboxylic acid group.

Other examples include monoesters and diesters of a, β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of monomers having a sulfonic acid group include vinyl sulfonic acid, methyl vinyl sulfonic acid, (meth) allyl sulfonic acid, styrene sulfonic acid, (meth) acrylic acid-2-ethyl sulfonate, 2-acrylamido-2-methylpropane sulfonic acid, 3-allyloxy-2-hydroxypropane sulfonic acid, and 2-(N-acryloyl) amino-2-methyl-1,3-propanedisulfonic acid.

In the present disclosure, "(meth) allyl" is used to indicate "allyl" and/or "methallyl".

Examples of monomers having a phosphate group include 2-(meth) acryloyloxyethyl phosphate, methyl-2-(meth) acryloyloxyethyl phosphate, and ethyl-(meth) acryloyloxyethyl phosphate.

In the present disclosure, "(meth) acryloyl" is used to indicate "acryloyl" and/or "methacryloyl".

These acid group-containing monomers may be used individually or in combination. Among them, a monomer having a carboxylic acid group is preferable, acrylic acid is more preferable, and methacrylic acid is further preferable.

Note that the proportion of the acid group-containing monomer in the particulate binder is preferably at least 0.1 mass %, more preferably at least 0.5 mass %, and preferably no greater than 5 mass % and more preferably no greater than 4 mass %. If the proportion of the acid group-containing monomer unit in the particulate binder is within the aforementioned range, the peel strength of the porous membrane and the cycle characteristics of the secondary battery can be further increased.

The particulate binder may preferably contain a crosslinkable monomer unit. If the particulate binder contains a crosslinkable monomer unit, elution of the particulate binder into an electrolysis solution can be suppressed. Thus, the cycle characteristics of the secondary battery can be further increased.

Crosslinkable monomers that can be used to form a crosslinkable monomer unit are typically monomers that are thermally crosslinkable. More specific examples of crosslinkable monomers that can be used include monofunctional monomers having a thermally crosslinkable group and one olefinic double bond per molecule, and multifunctional monomers having two or more olefinic double bonds per molecule.

Examples of thermally crosslinkable groups include an epoxy group, an N-methylol amide group, an oxetanyl group, an oxazoline group, and combinations thereof. Among these thermally crosslinkable groups, an epoxy group is preferable in terms of ease of adjustment of crosslinking and crosslink density.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allyl phenyl glycidyl ether; monoepoxides of dienes or polyenes such as butadiene monoepoxide, chloroprene monoepoxide, 4,5-epoxy-2-pentene, 3,4-epoxy-1-vinyl cyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of crosslinkable monomers having an N-methylol amide group as a thermally crosslinkable group and having an olefinic double bond include (meth) acrylamides having a methylol group such as N-methylol (meth) acrylamide.

Examples of crosslinkable monomers having an oxetanyl group as a thermally crosslinkable group and having an olefinic double bond include 3-((meth) acryloyloxymethyl) oxetane, 3-((meth) acryloyloxymethyl)-2-trifluoromethyloxetane, 3-((meth) acryloyloxymethyl)-2-phenyloxetane, 2-((meth) acryloyloxymethyl)oxetane, and 2-((meth) acryloyloxymethyl)-4-trifluoromethyloxetane.

Examples of crosslinkable monomers having an oxazoline group as a thermally crosslinkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of multifunctional monomers having two or more olefinic double bonds include allyl (meth) acrylate, ethylene di (meth) acrylate, diethylene glycol di (meth) acrylate, triethylene glycol di (meth) acrylate, tetraethylene glycol di (meth) acrylate, trimethylolpropane-tri (meth) acrylate, dipropylene glycol diallyl ether, polyglycol diallyl ether, triethylene glycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinyl benzene.

One crosslinkable monomer may be used individually, or two or more crosslinkable monomers may be used in combination. Among these crosslinkable monomers, crosslinkable monomers having an epoxy group or an N-methylol amide group as a thermally crosslinkable group and having an olefinic double bond is preferable, and allyl glycidyl ether and N-methylol acrylamide is more preferable.

The proportion of a crosslinkable monomer unit in a particulate binder is preferably at least 0.1 mass %, more preferably at least 0.5 mass %, and preferably no greater than 5 mass % and more preferably no greater than 4 mass %. If the proportion of the crosslinkable monomer unit in the particulate binder is in the aforementioned range, the cycle characteristics of a secondary battery can be further increased.

[Glass-Transition Temperature]

The glass-transition temperature of a polymer used as a particulate binder is preferably 20° C. or below, more preferably 0° C. or below and further preferably −10° C. or below. If the glass-transition temperature is 20° C. or below, a particulate binder will exhibit sufficiently high adhesiveness. Consequently, it is possible to sufficiently prevent the components contained in the porous membrane from falling from the porous membrane and sufficiently increase the peel strength of the porous membrane. Note that the glass-transition temperature of a polymer used as a particulate binder is typically −50° C. or above. The glass-transition temperature of a polymer can be measured in accordance with JIS K7121.

[Volume Average Particle Size]

Furthermore, the volume-average particle size of the particulate binder is preferably at least 50 nm, more preferably at least 100 nm, further preferably at least 200 nm and preferably no greater than 600 nm, more preferably no greater than 500 nm and further preferably no greater than 400 nm. If the volume-average particle size of the particulate binder is at least 50 nm, the dispersibility of the particulate binder can be increased. Further, the porous membrane is filled densely with the particulate binder, which increases the Gurley number of the porous membrane, and as a result, an increase in the internal resistance of the secondary battery can be suppressed. Further, if the volume-average particle size of particulate binder is no greater than 600 nm, it is possible to sufficiently prevent the α-alumina-based modified particles from falling from the porous membrane and increase the peel strength of the porous membrane.

In the present disclosure, the "volume-average particle size of the particulate binder" is in accordance with JIS Z8825, and represents a particle size (D50) at which, in a particle size distribution (volume basis) measured by laser diffraction, the cumulative volume calculated from a small diameter end of the distribution reaches 50%.

[Amount]

The amount of the particulate binder contained in the composition for a secondary battery porous membrane is preferably, per 100 parts by mass of the α-alumina-based modified particles, at least 1 parts by mass, more preferably at least 3 parts by mass, further preferably at least 5 parts by mass, and preferably no greater than 20 parts by mass, more preferably no greater than 18 parts by mass, and further preferably no greater than 10 parts by mass. If the amount of the particulate binder contained per 100 parts by mass of the α-alumina-based modified particles is at least 1 parts by mass, it is possible to sufficiently prevent the α-alumina-based modified particles from falling from the porous membrane and to increase the peel strength of the porous membrane as well. Further, if the amount of the particulate binder contained per 100 parts by mass of the α-alumina-based modified particles is no greater than 20 parts by mass, it is possible to secure the ion conductivity of the porous membrane and to suppress a decrease in the output characteristics of the secondary battery.

Examples of method of producing the aforementioned polymer that can be used as a particulate binder include solution polymerization, suspension polymerization, and emulsion polymerization. Among these production methods, emulsion polymerization and suspension polymerization are preferable as polymerization can be effected in water and thus a water dispersion containing a particulate binder can be suitably used as a material for the composition for a secondary battery porous membrane.

<Additive>

The composition for a secondary battery porous membrane may optionally contain other components besides the components described above. The aforementioned other components are not particularly limited as long as they do not affect battery reactions. One of such other components may be used individually, or two or more of such other components may be used in combination.

Examples of the aforementioned other components include additives such as dispersant, thickener and wetting agent.

[Dispersant]

In the present disclosure, water-soluble low-molecular weight polymers are used as a dispersant. In the present disclosure, the "low-molecular weight polymer" refers to a polymer that has a weight-average molecular weight of less than 110,000, and the "high-molecular weight polymer" refers to a polymer that has a weight-average molecular weight of at least 110,000. The "weight-average molecular weight" of a polymer can be measured by using the method described in the Examples of this specification. When a polymer is referred to as a "water-soluble" polymer in the present disclosure, this means that when 0.5 g of the polymer is dissolved in 100 g of water at a temperature of 25° C., insoluble content is less than 0.5 mass %.

Further, examples of dispersants may include water-soluble polymer that contains an acid group-containing monomer unit (including its salts such as ammonium salt and alkali metal salt). In the water-soluble polymer that contains an acid group-containing monomer, the water-soluble polymer itself also contains an acid group. In the composition for a porous membrane, the dispersion ability of the α-alumina-based modified particles is increased and the redispersibility of the composition for a porous membrane is further improved by the effects of acid group.

As the acid group-containing monomer that can form an acid group-containing monomer unit, the same monomers as those described in the item of the "particulate binder" can be used. One type of acid group-containing monomer may be used individually, or two or more types of acid group-containing monomers may be used in combination.

Among them, in view of further improvement of the redispersibility of the composition for a porous membrane, it is preferable to use at least one of a monomer that contains a carboxylic acid group and a monomer that contains a sulfonic acid group, and it is more preferable to use both of a monomer that contains a carboxylic acid group and a monomer that contains a sulfonic acid group. That is, it is preferable that a water-soluble polymer, which is a dispersant, contains at least one of a monomer unit that contains a carboxylic acid group and a monomer unit that contains a sulfonic acid group, and it is more preferable that the polymer contains both of a monomer unit that contains a carboxylic acid group and a monomer unit that contains a sulfonic acid group.

When a water-soluble polymer as a dispersant contains both of a monomer unit that contains a carboxylic acid group and a monomer unit that contains a sulfonic acid group, the ratio between these monomer units (the ratio of sulfonic acid group monomer/carboxylic acid group monomer) is preferably at least 1/999 and more preferably at least 0.01, and preferably no greater than 1, more preferably no greater than 0.5, and further preferably no greater than 0.3, by mass. If the ratio of carboxylic acid group monomer/sulfonic acid group monomer is at least 1/999, an increase in viscosity due to use of a dispersant can be suppressed and the stability of the composition for a porous membrane can be increased. On the other hand, if the ratio of carboxylic acid group monomer/sulfonic acid group monomer is no greater than 1, a dispersant can be adsorbed onto the α-alumina-based modified particle more satisfactory, and thus the dispersion ability of the α-alumina-based modified particles is increased, and the redispersibility of the composition for porous membrane can be further improved.

Preferred examples of water-soluble polymer as a dispersant include a copolymer that contains an acrylic acid unit and a sulfonic acid unit (acrylic acid/sulfonic acid based copolymer), a copolymer containing an acrylic acid unit and a maleic acid unit (acrylic acid/maleic acid based copolymer) and a low-molecular weight polymer consisting only on an acrylic acid unit (low-molecular weight polyacrylic acid) and salts thereof. Among them, in view of a further improvement of the redispersibility of the composition for a porous membrane, the acrylic acid/sulfonic acid based copolymer and its salts are preferable.

Such water-soluble polymers can be polymerized in a known method.

Note that the water-soluble polymer as a dispersant may contain a monomer unit other than the acid group-containing monomer. Further, the proportion of the acid group-containing monomer unit in the water-soluble polymer is preferably at least 80 mass %, more preferably at least 90 mass %, further preferably at least 95 mass % and particularly preferably 100 mass %.

Further, the weight-average molecular weight of water-soluble polymer as a dispersant is preferably at least 3,000, further preferably at least 4,000, and needs to be less than 110,000, and is preferably no greater than 100,000, more preferably no greater than 12,000 and further preferably no greater than 10,000. If the weight-average molecular weight of the water-soluble polymer as a dispersant is within the aforementioned range, the redispersibility of the composition for a porous membrane can be further improved while an increase in the viscosity caused by use of a dispersant is suppressed.

The amount of the water-soluble polymer, as a dispersant, contained in the composition for a porous membrane is preferably at least 0.05 parts by mass and more preferably at least 0.1 parts by mass, and preferably no greater than 2 parts by mass, more preferably no greater than 1 part by mass, and further preferably no greater than 0.8 parts by mass, per 100 parts by mass of α-alumina-based modified particle. If the amount of the water-soluble polymer is at least 0.05 parts by mass per 100 parts by mass of α-alumina-based modified particle, the redispersibility of the composition for a porous membrane can be further improved, and if it is no greater than 2 parts by mass, an increase in viscosity due to use of a dispersant is suppressed, and thus the stability of the composition for a porous membrane can be increased.

[Thickener]

In the present disclosure, water-soluble high-molecular weight polymer is used as a thickener.

As a thickener, water-soluble polymers (including its salt) such as high-molecular weight polymers (high molecular weight polyacrylic acid) composed only of carboxymethyl cellulose, polyacrylamide, polyvinyl alcohol and acrylic acid unit can be used. The weight-average molecular weight of the thickener needs to be at least 110,000, and is preferably no greater than 1,000,000. These polymers may be used individually or in combination.

The weight-average molecular weight of polyacrylamide as a thickener needs to be at least 110,000, and preferably it is at least 150,000, more preferably at least 250,000, further preferably at least 300,000, and preferably no greater than 1,000,000, more preferably no greater than 600,000, further preferably no greater than 500,000 and particularly preferably no greater than 400,000. If the polyacrylamide having a weight-average molecular weight within the aforementioned range is used as a thickener, the redispersibility of the composition for a porous membrane can be further increased.

Further, the weight-average molecular weight of high-molecular weight polyacrylic acid as a thickener needs to be at least 110,000, and is preferably at least 150,000, and preferably no greater than 1,000,000. If the high-molecular weight polyacrylic acid having a weight-average molecular weight within the aforementioned range is used as a thickener, the redispersibility of the composition for a porous membrane can be further increased.

The amount of the thickener contained in the composition for a porous membrane is preferably at least 0.1 parts by mass, more preferably at least 0.5 parts by mass, and even more preferably at least 1 part by mass, and is preferably no greater than 10 parts by mass, more preferably no greater than 3 parts by mass, and even more preferably no greater than 2 parts by mass, per 100 parts by mass of α-alumina-based modified particles. If the amount of thickener contained in the composition is at least 0.1 parts by mass per 100 parts by mass of α-alumina-based modified particles, the heat shrinkage of the porous membrane can be decreased, and if it is no greater than 10 parts by mass, generation of coating stripes when applying a composition for a porous membrane can be suppressed.

[Wetting Agent]

Furthermore, wetting agents are not particularly limited, and nonionic surfactants and anionic surfactants can be used. Among these agents, non-ionic surfactants such as an ethylene oxide-propylene oxide copolymer, polyoxyethylene polycyclic phenyl ether (represented by the formula of RO ($CH_2CH_2O$)nH, in the formula, R is a cyclic phenyl group, and n is a positive integer, which is 2 or more and 1000 or less, for example) is preferably used.

The amount of the wetting agent contained in the composition for a porous membrane is preferably at least 0.05 parts by mass, more preferably at least 0.1 parts by mass, and even more preferably at least 0.15 part by mass, and is preferably no greater than 2 parts by mass, more preferably no greater than 1.5 parts by mass, and even more preferably no greater than 1 part by mass, per 100 parts by mass of α-alumina-based modified particle. If the amount of the wetting agent is at least 0.05 parts by mass per 100 parts by mass of α-alumina-based modified particle, the wettability between a composition for a porous membrane and a substrate is secured, and generation of cissing can be suppressed, and if it is no greater than 2 parts by mass, an increase in the internal resistance caused by a decrease in the Gurley number of porous membrane can be suppressed.

<Preparation of Composition for Secondary Battery Porous Membrane>

The preparation methods of the composition for a secondary battery porous membrane are not limited. The composition can be obtained typically by mixing the aforementioned α-alumina-based modified particles, the particulate binder and optional additives used as needed in the presence of water-containing dispersion medium. Although the mixing methods are not particularly limited, mixing is performed by using a disperser as a mixing apparatus in order to efficiently disperse each component.

The disperser is preferably an apparatus that can homogeneously disperse and mix the aforementioned components. Examples of such apparatuses include a ball mill, a sand mill, a pigment disperser, a grinding machine, an ultrasonic disperser, a homogenizer, and a planetary mixer. Among such dispersers, a highly dispersing apparatus such as a bead mill, a roll mill, or a FILMIX is particularly preferable because a high dispersion shear can be applied.

The solid content concentration of the composition for a porous membrane can normally be freely set within a range such that the viscosity of the composition for a porous membrane is in a range that does not cause a loss of workability during production of a porous membrane. Specifically, the solid content concentration of the composition for a porous membrane can be from 10 mass % to 60 mass %.

(Porous Membrane for Secondary Battery)

The disclosed porous membrane for a secondary battery is formed by the aforementioned composition for a secondary battery porous membrane, and can be formed, for example, by applying the aforementioned composition for a porous membrane on the surface of an appropriate substrate to form a coating film, and after that drying the coating film. That is, the disclosed porous membrane for a secondary battery is a dried product of the aforementioned composition for a secondary battery porous membrane, and normally contains the aforementioned α-alumina-based modified particles, the aforementioned particulate binder and optionally aforementioned additive. When the aforementioned particulate binder contains a crosslinkable monomer unit, a particulate binder containing the crosslinkable monomer unit may be crosslinked at the time of drying of the composition for a secondary battery porous membrane or at the time of thermal treatment optionally performed after drying (in other words, the porous membrane for a secondary battery may include a crosslinked product of the aforementioned particulate binder).

Further, the disclosed porous membrane for a secondary battery is formed by using the aforementioned composition for a secondary battery porous membrane, and thus the porous membrane can exhibit an excellent peel strength and allows a secondary battery having the porous membrane to exhibit an excellent cycle characteristics.

<Substrate>

The substrates onto which the composition for a porous membrane is applied are not limited. For example, a coating film of the composition for a porous membrane may be formed on the surface of a detachable substrate, the coating film may be dried to form a porous membrane, and the detachable substrate may be peeled from the porous membrane. The porous membrane peeled from the detachable substrate as described above can be used to form a battery member of a secondary battery as a free-standing membrane. Specifically, a porous membrane peeled from the detachable substrate may be stacked on a separator substrate to form a separator having a porous membrane, or an electrode having a porous membrane may be formed by stacking a porous membrane peeled from the detachable substrate on an electrode substrate.

However, from a viewpoint of omitting a step of peeling the porous membrane to improve the production efficiency, it is preferable that a separator substrate or an electrode substrate is used as a substrate. The porous membrane provided on a separator substrate and on an electrode substrate can be preferably used as a protective layer that improves the heat resistance and the strength of the separator and the electrode.

[Separator Substrate]

Separator substrates are not particularly limited, and examples thereof include known separator substrates such as organic separator substrates. The organic separator substrate is a porous member composed of an organic material, and examples of organic separator substrate include fine porous membranes and non-woven fabrics containing polyolefin resins such as polyethylene or polypropylene or aromatic polyamide resins. A fine porous membrane or non-woven fabric made from polyethylene is preferable for its excellent strength. The separator substrate can have any thickness and preferably has a thickness of at least 0.5 μm, more preferably at least 5 μm, and preferably no greater than 40 μm, more preferably no greater than 30 μm, and even more preferably no greater than 20 μm.

[Electrode Substrate]

Electrode substrates (a positive electrode substrate and a negative electrode substrates) are not particularly limited and may, for example, be an electrode substrate obtained by forming an electrode mixed material layer on a current collector.

The current collector, an electrode active material (a positive electrode active material, a negative electrode active material) and a binder for electrode mixed material layer (binder for a positive-electrode mixed material layer, binder for a negative-electrode mixed material layer) in the electrode mixed material layer, and the method by which the electrode mixed material layer is formed on the current collector can be a known examples thereof such as described, for example, in JP2013-145763A.

<Forming Method of Porous Membrane for Secondary Battery>

Methods of forming a porous membrane on a substrate such as a separator substrate or an electrode substrate described above include:

1) Applying the disclosed composition for a secondary battery porous membrane on the surface of a separator substrate or an electrode substrate (in the case of the electrode substrate, on the surface of the electrode mixed material layer, the same applies below) and drying it;
2) Immersing a separator substrate or an electrode substrate into the disclosed composition for a secondary battery porous membrane and drying it; and
3) Applying the disclosed composition for a secondary battery porous membrane onto a releasable substrate and drying it to produce a porous membrane, and transferring a resultant porous membrane to the surface of a separator substrate or an electrode substrate.

Among these methods, method (1) is particularly preferable in terms that the thickness of the porous membrane can be easily controlled. More specifically, method (1) includes a step of applying the composition for a porous membrane onto the substrate (application step) and a step of drying the composition applied onto the substrate to form a porous membrane (porous membrane formation step).

[Application Step]

In the application step, the methods of applying a composition for a porous membrane onto a substrate are not particularly limited. The application method may, for example, be doctor blading, reverse roll coating, direct roll coating, gravure coating, extrusion coating, or brush coating.

[Porous Membrane Forming Step]

In the porous membrane forming step, methods of drying a composition for a porous membrane on a substrate are not particularly limited, and commonly known methods may be used. Such methods include drying by warm, hot, or low-humidity air, drying in a vacuum, or drying by irradiation with infrared light or electron beams. Although the drying conditions are not particularly limited, the drying temperature is preferably from 50° C. to 150° C., and the drying duration is preferably from 5 minutes to 30 minutes.

<Porous Membrane Thickness>

The thickness of a porous membrane formed on a substrate is preferably at least 0.01 μm, more preferably at least 0.1 μm, and particularly preferably at least 1 μm, and is preferably no greater than 20 μm, more preferably no greater than 10 μm, and further preferably no greater than 5 μm. If the thickness of the porous membrane is at least 0.01 μm, the strength of the porous membrane can be sufficiently secured, and if it is no greater than 20 μm, the diffusivity of the electrolysis solution is secured, and the output characteristics of a secondary battery including a porous membrane can be improved.

(Battery Member Including Porous Membrane)

In addition to the separator substrate or the electrode substrate and the disclosed porous membrane, the disclosed battery member (separator and electrode) including the disclosed porous membrane may have component(s) other than the aforementioned disclosed porous membrane as long as the disclosed effect is not significantly impaired.

The components other than the disclosed porous membrane are not particularly limited unless they are not the disclosed porous membrane, and may be, for example, a porous membrane provided on the disclosed porous membrane and used to bond between battery members.

(Secondary Battery)

The disclosed secondary battery includes the aforementioned disclosed porous membrane for a secondary battery. More specifically, the disclosed secondary battery includes a positive electrode, a negative electrode, a separator and an electrolysis solution, and the aforementioned porous membrane for a secondary battery is included at least one of a battery member such as a positive electrode, a negative electrode and a separator. The disclosed secondary battery includes a porous membrane obtained from the disclosed composition for a secondary battery porous membrane, and thus exhibits excellent cell characteristics (e.g. cycle characteristics).

<Positive Electrode, Negative Electrode and Separator>

At least one of the positive electrode, the negative electrode, and the separator used in the disclosed secondary battery includes the disclosed porous membrane. Specifically, an electrode produced by providing the disclosed porous membrane on an electrode substrate that is obtained by forming an electrode mixed material layer on a current collector can be used as a positive electrode including a porous membrane or a negative electrode including a porous membrane. Moreover, as a separator including a porous membrane, a separator formed by providing the disclosed porous membrane on a separator substrate may be used. Note that, as an electrode substrate and a separator substrate, the similar substrates as those described in the "Porous Membrane for Secondary Battery" can be used.

Further, a positive electrode, a negative electrode, or a separator that does not include a porous membrane is not particularly limited, and an electrode composed of the aforementioned electrode substrate and a separator composed of the aforementioned separator substrate may be used.

<Electrolysis Solution>

As an electrolysis solution, an organic electrolysis solution obtained by dissolving a supporting electrolyte into an organic solvent is normally used. The supporting electrolyte may, for example, be a lithium salt in the case of a lithium ion secondary battery. Examples of lithium salts include, for example, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these lithium salts, $LiPF_6$, $LiClO_4$, and $CF_3SO_3Li$ are preferable as they readily dissolve in solvents and exhibit a high degree of dissociation. Note that one type of electrolyte may be used individually or two or more types of electrolytes may be used in combination. Normally, lithium ion conductivity tends to increase as a supporting electrolyte with a higher degree of dissociation is used. Therefore, the lithium ion conductivity can be adjusted according to the type of a supporting electrolyte.

The organic solvent used in the electrolysis solution is not particularly limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Among them, carbonates are preferable in terms of having high permittivity and a wide stable potential region. Normally, lithium ion conductivity tends to increase as the viscosity of the employed solvent decreases. Therefore, lithium ion conductivity can be adjusted according to the type of solvent.

The electrolyte concentration of the electrolysis solution can be appropriately adjusted. Moreover, a known additive may be added to the electrolysis solution (Secondary Battery Production Method)

The aforementioned disclosed secondary battery can be produced by, for example, overlapping a positive electrode and a negative electrode with a separator in-between, performing rolling, folding, or the like of the resultant product as necessary to place the resultant product in a battery container, pouring an electrolysis solution into the battery container, and sealing the battery container. At least one of the positive electrode, the negative electrode, and the separator is a porous membrane-equipped member. In order to prevent a pressure increase inside the battery and occurrence of overcharging or overdischarging, an expanded metal; an overcurrent preventing device such as a fuse or a PTC device; or a lead plate may be provided in the battery container as necessary. The shape of the battery may for example be a coin type, a button type, a sheet type, a cylinder type, a prismatic type, or a flat type.

EXAMPLES

Hereinafter, the present disclosure will be specifically described with reference to Examples. However, the disclosure is not limited to the Examples. In the following, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

In the Examples and the Comparative Examples, infrared diffuse reflection spectrometry, evolved gas mass spectrometry, specific surface area and volume-average particle size of inorganic particles, glass-transition temperature and volume-average particle size of particulate binder, weight-average molecular weight of polymer, redispersibility of composition for a porous membrane, water content of a separator, peel strength of a porous membrane, and cycle characteristics of a secondary battery were measured and evaluated by the method described below.

<Infrared Diffuse Reflection Spectrometry of Inorganic Particles>

The infrared diffusion reflection spectrum was measured by using the Fourier transform infrared spectrometer ("Varian-7000" from Varian). Measurement was made at a room temperature (20° C.) while nitrogen is flown as an inactive gas.

<Evolved Gas Mass Spectrometry of Inorganic Particles>

Measurement was made as described below in accordance with the TPD-MS (Temperature Programmed Desorption-Mass Spectrometry) method.

Measurement device: A special heating device from Toray Research Center was used as a heating device and "GCMS-QP5050" from Shimazu Corporation was used as a mass spectroscope.

Measurement sample: Inorganic particles were dried for 30 minutes in an oven at a temperature of 80° C. and was left in a desiccator with its humidity adjusted to 30% or less for 24 hours to provide a measurement sample.

Measurement conditions: 20 mg of the aforementioned measurement sample was placed in the aforementioned heating device and was heated from 20° C. to 1000° C. at a heating rate of 20/min. under the condition of helium flow rate of 50 cc/min. and the moisture generation rate was measured.

Moisture generation amount X near $W_{max}$: A baseline was defined by connecting the point of 200° C. and the point of 260° C. of the resulting moisture generation rate curve. Subsequently, the temperature on the horizontal axis was converted to the time (sec.), and the area of the region surrounded by the moisture generation rate curve and the baseline was calculated to determine the moisture generation amount X near $W_{max}$ (mass ppm).

<Specific Surface Area of Inorganic Particles>

The BET specific surface area of inorganic particles was calculated by using a wet measurement device of specific surface area ("flowSorb III 2305" from Shimazu Corporation).

<Volume-Average Particle Size of Inorganic Particles>

The aqueous dispersion of inorganic particles was dripped into a flow cell to which ion-exchanged water was supplied such that the scattering intensity will be about 50% and was subjected to ultrasonic dispersion. Subsequently, the particle size distribution (volume basis) was measured by using a laser diffraction particle size analyzer ("SALD-7100" from Shimazu Corporation). The particle size at which, in the measured particle size distribution, the cumulative volume calculated from a small diameter end reaches 50% is defined as a volume-average particle size (D50).

<Glass-transition Temperature of Particulate Binder>

The DSC curve was measured by using a differential scanning calorimeter ("EXSTAR DSC 6220" from SIT NanoTechnology Inc.) in accordance with JIS K7121. Specifically, 10 mg of dried measurement sample was weighed into an aluminum pan and an empty aluminum pan was used as a reference. The DSC curve was measured at normal temperature and normal humidity, in the measurement temperature range of from −100° C. to 50° C., and at a heating rate of 10° C./min. In this heating step, the glass-transition temperature was determined from the point of intersection of the baseline immediately before appearance of an endothermic peak in the DSC curve where the differential signal (DDSC) reaches 0.05 mW/min./mg or higher with the tangent to the DSC curve at the inflection point that appears first after the endothermic peak.

<Volume-Average Particle Size of Particulate Binder>

Water dispersion adjusted to have a solid content concentration of 0.1 mass % was used, and the particle size distribution (volume basis) was measured in accordance with JIS Z8825 by using a laser diffraction particle size analyzer ("SALD-7100" from Shimazu Corporation). The particle size at which, in the measured particle size distribution, the cumulative volume calculated from a small diameter end reaches 50% was defined as a volume-average particle size (D50).

<Weight-Average Molecular Weight of Polymer>

The weight-average molecular weight of polymer was measured by using a LiBr-NMP solution gel permeation chromatography (GPC) of 10 mM concentration under the following measurement conditions.

Separation column: Shodex KD-806M (from Showa Denko K.K.)

Detector: Differential refractive index detector RID-10A (from Shimazu Corporation)

Eluent flow rate: 0.3 mL/min
Column temperature: 40° C.
Reference polymer: TSK, Reference polystyrene (from Tosoh Corporation)

<Redispersibility of Composition for Porous Membrane>

About 1 kg of composition for a porous membrane was stored for a predetermined period of time and subjected to redispersion treatment, and subsequently filtered with 635 SUS wire mesh. Subsequently, the residues on the wire was washed with ion-exchanged water and dried at a temperature of 105° C. for one hour. The wire with dried residues attached was weighted and the residue amount on the mesh was calculated by the following formula.

Residue amount on mesh (mass ppm)=$(a-b)/(c \times d/100) \times 1000000$ a: Mass of wire with dried residue attached (g)
b: Mass of wire (g)
c: Mass of composition for a porous membrane (g)
d: Solid content concentration of composition for a porous membrane (mass %)

Evaluation was made by using the determined residue amount on the mesh based on the criteria described below. A smaller residue amount on the mesh indicates better dispersibility of a composition for a porous membrane after redispersion treatment.

AA: Residue amount on the mesh is less than 40 mass ppm
A: Residue amount on the mesh is at least 40 mass ppm and less than 50 mass ppm
B: Residue amount on the mesh is at least 50 mass ppm and less than 150 mass ppm
C: Residue amount on the mesh is at least 150 mass ppm and less than 450 mass ppm
D: Residue amount on the mesh is at least 450 mass ppm <Moisture Content of Separator>

A separator (with porous membrane) was cut into a size of 10 cm×10 cm and was used as a test piece. The test piece was left in an atmosphere having a temperature of 25° C. and a dew point of −60° C. for 24 hours, and the moisture content W (mass ppm) of the test piece was measured in accordance with the Karl Fischer method (JIS K-0068 (2001) water vaporization method; vaporization temperature of 150° C.) by using a coulometric titration water meter and was evaluated as follows. A smaller amount indicates that less amount of moisture was imported into a secondary battery through a porous membrane.

A: Moisture content W is no greater than 500 mass ppm
B: Moisture content W is greater than 500 mass ppm and no greater than 600 mass ppm
C: Moisture content W is greater than 600 mass ppm and no greater than 700 mass ppm
D: Moisture content W is greater than 700 mass ppm <Peel Strength of Porous Membrane>

A separator (with porous membrane) was cut into a rectangular piece measuring 100 mm in length and 10 mm in width and was used as a test piece. Cellophane tape (prescribed by JIS Z1522) was attached to the surface of porous membrane which faced downward. Thereafter the stress at the time when one end of the separator substrate was pulled vertically at a pulling rate of 100 mm/min. and peeled off was measured (note that the cellophane tape was fixed to a test bed). This measurement was performed three times and an average value was determined as the peel strength, and the evaluation was made based on the following criteria. A larger peel strength indicates a better adhesiveness of a porous membrane to a separator substrate.

A: Peel strength is at least 100 N/m
B: Peel strength is at least 75 N/m and less than 100 N/m
C: Peel strength is less than 75 N/m <Cycle Characteristics of Secondary Battery>

A produced lithium ion secondary battery was subjected to a charge/discharge cycle in which the lithium ion secondary battery was charged to 4.2 V with a 0.2C constant current and discharged to 3.0 V with a 0.2 C constant current at an ambient temperature of 60° C. The charge/discharge was repeated 50 cycles, and a ratio between the 50th discharge capacity and the initial discharge capacity (a discharge capacity for the first cycle) was calculated. Measurement was performed 10 times with different cells and an average value was determined as a capacity maintenance rate, which was evaluated according to the following criteria. The larger the capacity maintenance rate is, the smaller the capacity reduction due to repeated charge/discharge, which indicates excellent high-temperature cycle characteristics.

A: Capacity maintenance rate is at least 80%
B: Capacity maintenance rate is at least 70% and less than 80%
C: Capacity maintenance rate is less than 70%

Example 1

<Preparation of α-Alumina-Based Modified Particles>

The α-alumina particles ("LS-256" from Nippon Light Metal Company Ltd., volume-average particle size: 0.8 μm, specific surface area: 6.4 m²/g) produced by using the Bayer process was put in an oven filled with saturated water vapor at a temperature of 100° C. for 10 minutes (processing time) to obtain α-alumina-based modified particles. The specific surface area of the α-alumina-based modified particles was measured. The results are shown in Table 1.

The infrared diffuse reflectance spectrum of the resultant α-alumina-based modified particles was measured.

FIG. 1 illustrates an infrared diffuse reflectance spectrum at a temperature of 20° C. As described above, the resultant spectrum has a relatively large shoulder-like peak at 3550 cm⁻¹ and a relatively small shoulder-like peak at 3655 cm⁻¹.

These two peaks decrease as the measurement temperature increases (not illustrated). Specifically, these peaks disappeared completely when the α-alumina-based modified particles were measured at a temperature of 200° C. after they were held at the same temperature for one hour. The infrared diffuse reflectance spectrum at the time when stored at a temperature of 200° C. for one hour was almost the same as that of α-alumina particles measured separately in the same manner. This might have been caused because the aluminum hydroxide contained in α-alumina-based modified particle was dehydrated to be α-alumina.

Further, the resultant α-alumina-based modified particles were subjected to the evolved gas mass spectrometry (FIG. 2). As described above, the resultant moisture generation rate curve has $W_{max}$ at a temperature of 240° C. The moisture generation amount X near $W_{max}$ was calculated from the moisture generation rate curve. The results are shown in Table 1.

<Preparation of Particulate Binder>

A reaction vessel equipped with a stirrer was charged with 70 parts of ion-exchanged water, 0.15 parts of sodium lauryl sulfate ("EMAL 2F (EMAL is a registered trademark in Japan, other countries, or both) from Kao Corporation) as an emulsifier, and 0.5 parts of ammonium persulfate as a polymerization initiator. The gas phase in the reaction vessel was purged with nitrogen gas and the reaction vessel was heated to 60° C. On the other hand, 50 parts of ion-exchanged water, 0.8 parts of sodium dodecylbenzenesulfonate as an emulsifier, 2 parts of acrylonitrile as a (meth) acrylonitrile monomer, 93.8 parts of butylacrylate as a (meth) acrylic ester monomer, 2 parts of methacrylic acid as an acid group-containing monomer, one part of allyl glycidyl ether and 1.2 parts of N-methylolacrylamide as a crosslinkable monomer and 0.15 parts of ethylenediamine tetrasodium acetate tetrahydrate ("Chelest 400G" from Chelest Co.) as a chelating agent were mixed in another vessel to obtain a monomer composition. The monomer composition was continuously added to the reactor over 4 hours for polymerization. The reaction was carried out at a temperature of 60° C. during the addition. After addition, the monomer composition was further stirred at a temperature of 70° C. for 3 hours and the reaction was finished. Thereafter, water dispersion of the particulate binder (acrylic-based polymer) was prepared. The glass-transition temperature and volume-average particle size of the particulate binder were measured by using the water dispersion. The results are shown in Table 1.

<Preparation of Dispersant>

A monomer composition was obtained by mixing 50 parts of ion-exchanged water, 80 parts of acrylic acid as a monomer having a carboxylic acid group, 19.92 parts of 2-acrylamido-2-methylpropane sulfonic acid and 0.08 parts of 2-(N-acryloyl) amino-2-methyl-1,3-propane disulfonic acid as a monomer having a sulfonic acid group were mixed to obtain a monomer composition. Subsequently, 150 parts of ion-exchanged water was charged into a four-neck flask equipped with a thermometer, a stirrer and a reflux condenser and a temperature was increased to 80° C. Under stirring, the aforementioned monomer composition and 10 parts of 30% sodium persulfate aqueous solution as a polymerization initiator were each dripped continuously by a metering pump into the flask over 3 hours for polymerization reaction at a temperature of 80° C. After dripping was completed, the resultant was aged for one hour while the flask was kept at a temperature of 80° C. to complete the polymerization reaction. Thereafter, 120 parts of 32% sodium hydroxide water solution was added to the flask to neutralize the reaction solution completely, and a water solution of a dispersant of water-soluble polymer (acrylic acid/sulphonic acid copolymer) was obtained. The weight-average molecular weight of the resultant water-soluble polymer was measured. The results are shown in Table 1.

<Preparation of Composition for Secondary Battery Porous Membrane>

The resultant 100 parts of α-alumina-based modified particles obtained in the aforementioned manner and 0.5 parts in terms of solid content of water solution of water-soluble polymer as a dispersant were mixed, and further, ion-exchanged water was added thereto such that the solid content concentration will be 55% to obtain a mixed solution. Subsequently, the mixed solution was dispersed in one pass by using a media-less disperser ("inline disperser MKO" from IKA) under the conditions of a tip speed of 10 m/sec. and a flow rate of 200 L/h to obtain aqueous dispersion of α-alumina-based modified particles. The volume-average particle size of α-alumina-based modified particle was measured by using this aqueous dispersion. The results are shown in Table 1.

This aqueous dispersion and 37.5 parts of 4% aqueous solution of carboxymethyl cellulose (1.5 parts in terms of the amount of carboxymethyl cellulose) (weight-average molecular weight: 110,000 or more) as a thickener were mixed, and 13.3 parts of water dispersion of particulate binder (6 parts in terms of the amount of particulate binder) and 0.2 parts of aqueous solution in terms of solid content of an ethylene oxide-propylene oxide copolymer (surfactants obtained through polymerization of ethylene oxide and propylene oxide at a polymerization ratio (molar ratio) of 50:50) as a non-ionic surfactant as a wetting agent were mixed to obtain a prepared solution.

The resultant prepared solution was filtered by a filter (average pore diameter: 10 μm), and filtered further by a magnet filter (from TOK ENGINEERING Co., Ltd.) in 10 passes under the conditions of room temperature and the magnetic flux density of 8000 gauss to remove magnetic material, and a composition for a secondary battery porous membrane was obtained.

<Storage and Redispersion of Composition for Secondary Battery Porous Membrane>

The resultant composition for a porous membrane was transferred to a storage container (100 L drum can), sealed and stored at a temperature of 20° C. for 12 months. In this case, the amount of the composition for a porous membrane in the storage container was adjusted such that the volume of the space formed in the storage container will be 30 volume % of the volume of the storage container, and the storage container was sealed.

Figure 3:
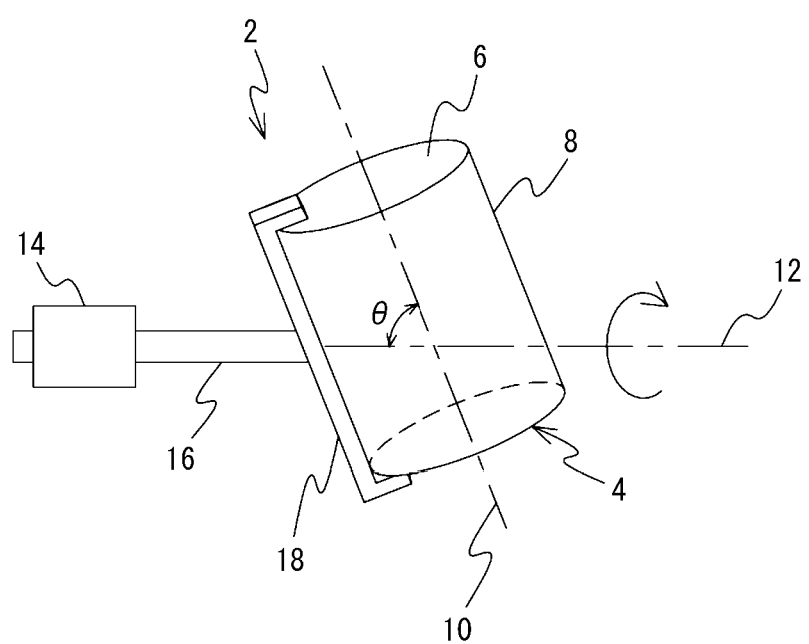
FIG. 3 illustrates an example of a stirrer used for redispersion treatment of a composition for a secondary battery porous membrane.

The storage container was stored for 12 months and was set in the stirrer 2 illustrated in FIG. 3. The stirrer 2 illustrated in FIG. 3 is in the state where the storage container 8 is held by the storage container holder 18. The stirrer 2 includes a motor 14 and a rotation axis 16 for rotating the storage container. The angle θ formed by an axial line 10 passing vertically through the lower face 4 and the upper face 6 of the storage container 8 and the horizontal axis 12 was fixed to 70°.

The storage container was rotated 15 times in the far side of the plane (in the direction of an arrow in FIG. 3) and then rotated 15 times in the near side of the plane (opposite direction of the arrow in FIG. 3), which is defined as 1 pass of the stirring and mixing step and 32 passes of this stirring and mixing step were performed to redisperse the composition for a porous membrane. The composition for a porous membrane after redispersion was used to evaluate the redispersion. The results are shown in Table 1.

<Production of Porous Membrane and Separator>

An organic separator substrate (thickness: 12 μm), which is a porous substrate made of polyethylene, was prepared. The aforementioned composition for a porous membrane after redispersion was applied on one side of the prepared organic separator substrate and was dried at a temperature of 50° C. for 3 minutes. Thus, a separator including a porous membrane (thickness: 4 μm) was produced. The resultant separator was used to evaluate the peel strength of the porous membrane and moisture content of the separator. The results are shown in Table 1.

<Production of Positive Electrode>

A slurry composition for a positive electrode was prepared by mixing 95 parts of $LiCoO_2$ as a positive electrode active material, 2 parts of acetylene black ("HS-100" from DENKA Company Limited) as a conductor, 3 parts in terms of solid content of polyvinylidene difluoride ("KF-1100" from KUREHA Corporation) as a positive electrode binder and 20 parts of N-methylpyrrolidone were mixed to prepare a slurry composition for a positive electrode.

The resultant slurry composition for a positive electrode was applied on an aluminum foil with a thickness of 18 μm, which is a current collector, by using a comma coater, and dried at a temperature of 120° C. for 3 hours to obtain a positive electrode web. The positive electrode web was rolled by a roll press to obtain a positive electrode with a thickness of 100 μm.

<Production of Negative Electrode>

33 parts of 1,3-butadiene, 3.5 parts of itaconic acid, 63.5 parts of styrene, 4 parts of sodium dodecylbenzenesulfonate as an emulsifier, 200 parts of ion-exchanged water, and 0.5 parts of potassium persulfate as a polymerization initiator were put in a 5 MPa pressure vessel with a stirrer and stirred sufficiently. Thereafter, they were heated to 50° C. and polymerization was started. After 12 hours, unreacted monomers were removed by introducing steam. Thus, a water dispersion containing a desired binder for a negative-electrode mixed material layer was obtained.

70 parts of artificial graphite (specific surface area: 4 m$^2$/g, volume average particle size: 24.5 μm) and 30 parts of SiOx (from Shin-Etsu Chemical Co., Ltd., volume average particle size: 5 μm) as a negative electrode active material and 1 part in terms of solid content of 1% aqueous solution of carboxymethyl cellulose ("BSH-12" from DKS Co., Ltd.) as a thickener were added to a planetary mixer with a disper blade. Subsequently the ion-exchanged water was added thereto to adjust the solid content concentration to 55% and the mixture was mixed at a temperature of 25° C. for 60 minutes. Subsequently the solid content concentration was adjusted to 52% with the ion-exchanged water and the mixture was further mixed at a temperature of 25° C. for 15 minutes to yield a mixed solution. 1.0 part in terms of solid content of water dispersion that contains a binder for a negative-electrode mixed material layer was added to the mixed solution and ion-exchanged water was added thereto to adjust to obtain a final solid content concentration of 50%. The mixture was stirred further for 10 minutes. The resultant mixture was subjected to a defoaming step under reduced pressure to yield a slurry for a negative electrode having good fluidity.

The slurry composition for a negative electrode was applied onto a copper foil of 20 μm in thickness used as a current collector by using a comma coater such that a film thickness after drying of approximately 150 μm will be obtained, and was dried. This drying was performed by transporting the copper foil through an oven at a temperature of 60° C. at a rate of 0.5 m/min. over 2 minutes. Heating treatment was subsequently performed at a temperature of 120° C. for 2 minutes to obtain a negative electrode web. The resultant negative electrode web was rolled by a roll press and a negative electrode with a thickness of 100 μm was obtained.

<Production of Lithium Ion Secondary Battery>

The resultant positive electrode was cut into a 13 mm-diameter circle. Subsequently, the aforementioned resultant separator was cut into an 18 mm-diameter circle, which was arranged such that a porous membrane will be in contact with the surface on the side of positive electrode mixed material layer of the positive electrode. Furthermore, the aforementioned resultant negative electrode was cut into a 14 mm-diameter circle, which was arranged such that the surface of the side of the negative-electrode mixed material layer will be in contact with the surface of the separator substrate of the separator. Subsequently, an expanded metal was arranged on the surface on the current collector side of the negative electrode to obtain a laminate. The laminate was placed in a coin type exterior container (diameter: 20 mm, height: 1.8 mm, stainless steel thickness: 0.25 mm) provided with a polypropylene packing. The container was filled with an electrolysis solution (solution of a mixed solvent of ethylene carbonate (EC), ethylmethyl carbonate (EMC) and vinylene carbonate (VC) mixed with a ratio of EC:EMC:VC=68.5:30.0:1.5 (volume ratio at a temperature of 20° C.) dissolved with LiPF$_6$ at 1M concentration) such that no air is left. Subsequently, the external container was covered with a stainless steel cap with a thickness of 0.2 mm through the polypropylene packing and fixed. Thereafter a battery can was sealed to produce a full cell coin cell lithium ion secondary battery (coin cell CR2032) with a diameter of 20 mm and a thickness of about 3.2 mm. The produced lithium ion secondary battery was used to evaluate the cycle characteristics. The results are shown in Table 1.

Example 2

α-alumina-based modified particles, particulate binders, dispersants, compositions for porous membrane, porous membranes and separators, negative electrodes, positive electrodes, and lithium ion secondary batteries were produced in the same manner as those described in Example 1 except that α-alumina particles (volume-average particle size: 0.4 μm, specific surface area: 7.4 m$^2$/g) were used to prepare α-alumina-based modified particles, and were subjected to various evaluations. The results are shown in Table 1.

Note that the employed α-alumina-based modified particles were confirmed that they had a peak in the region from 3500 cm$^{-1}$ to 3600 cm$^{-1}$ in an infrared diffuse reflectance spectrum measurement.

Examples 3 to 5

α-alumina-based modified particles, particulate binders, dispersants, compositions for porous membrane, porous membranes and separators, negative electrodes, positive electrodes, and lithium ion secondary batteries were produced in the same manner as those described in Example 1 except that the processing times to prepare α-alumina-based modified particles in the oven were changed respectively to 25 minutes, 2 hours and 4 minutes, and were subjected to various evaluations. The results are shown in Table 1.

Note that the employed α-alumina-based modified particles were confirmed that they had a peak in the region from 3500 cm$^{-1}$ to 3600 cm$^{-1}$ in an infrared diffuse reflectance spectrum measurement.

Examples 6 to 10

Particulate binders, dispersants, compositions for porous membrane, porous membranes and separators, negative electrodes, positive electrodes, and lithium ion secondary batteries were produced in the same manner as those described in Examples 1 to 5 except that, instead of 4% aqueous solution of carboxymethyl cellulose, 10 parts (1.5 parts in terms of the amount of polyacrylamide A) of 15% aqueous solution of polyacrylamide A ("polystron (polystron is a registered trademark in Japan, other countries, or both) 117" from Arakawa Chemical Industries Ltd., weight-average molecular weight: 350,000) was used as a thickener when compositions for porous membrane was prepared, and were subjected to various evaluations. The results are shown in Table 1.

Example 11

Particulate binders, dispersants, compositions for porous membrane, porous membranes and separators, negative electrodes, positive electrodes, and lithium ion secondary batteries were produced in the same manner as those described in Example 1 except that, instead of 4% aqueous solution of carboxymethyl cellulose, 5 parts (1.5 parts in terms of the amount of polyacrylamide B) of 30% aqueous solution of polyacrylamide B ("polymerset (polymerset is a registered trademark in Japan, other countries, or both) HP-710" from Arakawa Chemical Industries Ltd., weight-average molecular weight: 130,000) was used as a thickener when compositions for porous membrane were prepared, and were subjected to various evaluations. The results are shown in Table 2.

Example 12

Particulate binders, dispersants, compositions for porous membrane, porous membranes and separators, negative electrodes, positive electrodes, and lithium ion secondary batteries were produced in the same manner as those described in Example 1 except that, when compositions for porous membrane were prepared, 18.75 parts (0.75 parts in terms of the amount of carboxymethyl cellulose) of 4% aqueous solution of carboxymethyl cellulose and 5 parts (0.75 parts in terms of the amount of polyacrylamide A) of 15% aqueous solution of polyacrylamide A were used as a thickener, and were subjected to various evaluations. The results are shown in Table 2.

Example 13

Particulate binders, dispersants, compositions for porous membrane, porous membranes and separators, negative electrodes, positive electrodes, and lithium ion secondary batteries were produced in the same manner as those described in Example 1 except that, when compositions for porous membrane were prepared, instead of 4% aqueous solution of carboxymethyl cellulose, 5.8 parts (1.5 parts in terms of the amount of high molecular weight polyacrylic acid) of 26% aqueous solution of high molecular amount polyacrylic acid salt (weight-average molecular weight: 200,000) were used as a thickener, and were subjected to various evaluations. The results are shown in Table 2.

Example 14

Particulate binders, dispersants, compositions for porous membrane, porous membranes and separators, negative electrodes, positive electrodes, and lithium ion secondary batteries were produced in the same manner as those described in Example 1 except that, when compositions for porous membrane were prepared, instead of 4% aqueous solution of carboxymethyl cellulose, 37.5 parts (1.5 parts in terms of the amount of polyvinyl alcohol) of 4% aqueous solution of polyvinyl alcohol (weight-average molecular weight: 125,000) were used as a thickener, and were subjected to various evaluations. The results are shown in Table 2.

Example 15

Particulate binders, dispersants, compositions for porous membrane, porous membranes and separators, negative electrodes, positive electrodes, and lithium ion secondary batteries were produced in the same manner as those described in Example 6 except that, when compositions for porous membrane were prepared, instead of acrylic acid/sulfonic acid copolymer, 0.5 parts in terms of solid content of aqueous solution of acrylic acid/maleic acid-based copolymer salt (from Nippon Shokubai Co., Ltd., weight-average molecular weight 6,000) were employed, and were subjected to various evaluations. The results are shown in Table 2.

Example 16

Particulate binders, dispersants, compositions for porous membrane, porous membranes and separators, negative electrodes, positive electrodes, and lithium ion secondary batteries were produced in the same manner as those described in Example 6 except that, when compositions for porous membrane were prepared, instead of acrylic acid/sulfonic acid copolymer, 0.5 parts in terms of solid content of aqueous solution of low-molecular weight polyacrylic acid salt (weight-average molecular weight: 6,000) was used, and were subjected to various evaluations. The results are shown in Table 2.

Example 17

Particulate binders, dispersants, compositions for porous membrane, porous membranes and separators, negative electrodes, positive electrodes, and lithium ion secondary batteries were produced in the same manner as those described in Example 6 except that, when particulate binders are prepared, an acrylic-based polymer having a composition described in Table 2 was prepared, and were subjected to various evaluations. The results are shown in Table 2.

Comparative Example 1

Particulate binders, dispersants, compositions for porous membrane, porous membranes and separators, negative electrodes, positive electrodes, and lithium ion secondary batteries were produced in the same manner as those described in Example 1 except that, when compositions for porous membrane were prepared, instead of α-alumina-based modified particles, aluminum hydroxide particles ("H43M" from Showa Denko K.K., volume-average particle size: 0.8 μm, specific surface area: 6.7 m²/g, aluminum hydroxide content: 99.6%, α-alumina content: 0%) were used, and were subjected to various evaluations. The results are shown in Table 2.

Comparative Example 2

Particulate binders, dispersants, compositions for porous membrane, porous membranes and separators, negative electrodes, positive electrodes, and lithium ion secondary batteries were produced in the same manner as those described in Example 1, except that, when compositions for porous membrane were prepared, instead of α-alumina-based modified particles, α-alumina particles ("LS-256" from Nippon Light Metal Co., Ltd., volume-average particle size: 0.8 μm, specific surface area: 6.4 m²/g) were used, and were subjected to various evaluations. The results are shown in Table 2.

The employed α-alumina particles were confirmed by the infrared diffuse reflectance spectrometry that they had no peak in the region from 3500 cm$^{-1}$ or more to 3600 cm$^{-1}$ or less.

In Tables 1 and 2, "modified particle" represents α-alumina-based modified particle, "ACL" represents acrylic polymer, "BA" represents butyl acrylate unit, "AN" represents acrylonitrile unit, "MAA" represents methacrylic acid unit, "AMPS" represents 2-acrylamido-2-methylpropane sulfonic acid unit, "AGE" represents allyl glycidyl ether unit, "NMAAm" represents N-methylol acrylamide unit, "AA/SA" represents acrylic acid/sulphonic acid based copolymer salt, "AA/MA" represents acrylic acid/maleic acid based copolymer salt, "LPAA" represents low-molecular weight polyacrylic acid salt, "CMC" represents carboxymethyl cellulose, "PAAm (A)" represents polyacrylamide A, "PAAm (B)" represents polyacrylamide B, "HPAA" represents high-molecular weight polyacrylic acid salt, "PVA" represents polyvinyl alcohol and "EO/PO" represents ethylene oxide-propylene oxide copolymer.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Inorganic particle | Type | Modified particle | Modified particle | Modified particle | Modified particle | Modified particle | Modified particle | Modified particle | Modified particle | Modified particle | Modified particle |
| | Water generation amount X near Wmax [mass ppm] | 100 | 100 | 500 | 15000 | 15 | 100 | 100 | 500 | 15000 | 15 |
| | Volume average particle size [μm] | 0.8 | 0.4 | 0.8 | 0.8 | 0.8 | 0.8 | 0.4 | 0.8 | 0.8 | 0.8 |
| | Specific surface area [m²/g] | 6.4 | 7.4 | 6.4 | 6.5 | 6.4 | 6.4 | 7.4 | 6.4 | 6.5 | 6.4 |
| | Blending amount [parts by mass] | 100 | 100 | 100 | 100 | 100 | 100 | 100 | 100 | 100 | 100 |
| | Proportion in total solid content [mass %] | 92 | 92 | 92 | 92 | 92 | 92 | 92 | 92 | 92 | 92 |
| Particulate binder | Type | ACL | ACL | ACL | ACL | ACL | ACL | ACL | ACL | ACL | ACL |
| | Composition BA [mass %] | 93.8 | 93.8 | 93.8 | 93.8 | 93.8 | 93.8 | 93.8 | 93.8 | 93.8 | 93.8 |
| | AN | 2 | 2 | 2 | 2 | 2 | 2 | 2 | 2 | 2 | 2 |
| | MAA | 2 | 2 | 2 | 2 | 2 | 2 | 2 | 2 | 2 | 2 |
| | AMPS | — | — | — | — | — | — | — | — | — | — |
| | AGE | 1 | 1 | 1 | 1 | 1 | 1 | 1 | 1 | 1 | 1 |
| | NMAAm | 1.2 | 1.2 | 1.2 | 1.2 | 1.2 | 1.2 | 1.2 | 1.2 | 1.2 | 1.2 |
| | Glass transition temperature [° C.] | -47 | -47 | -47 | -47 | -47 | -47 | -47 | -47 | -47 | -47 |
| | Volume average particle size [nm] | 350 | 350 | 350 | 350 | 350 | 350 | 350 | 350 | 350 | 350 |
| | Blending amount [parts by mass] | 6 | 6 | 6 | 6 | 6 | 6 | 6 | 6 | 6 | 6 |
| Dispersant (water soluble polymer) | Type | AA/SA | AA/SA | AA/SA | AA/SA | AA/SA | AA/SA | AA/SA | AA/SA | AA/SA | AA/SA |
| | Ratio of sulfonate group monomer/carboxylic acid group monomer [—] | 0.25 | 0.25 | 0.25 | 0.25 | 0.25 | 0.25 | 0.25 | 0.25 | 0.25 | 0.25 |
| | Weight average molecular weight [—] | 6000 | 6000 | 6000 | 6000 | 6000 | 6000 | 6000 | 6000 | 6000 | 6000 |
| | Blending amount [parts by mass] | 0.5 | 0.5 | 0.5 | 0.5 | 0.5 | 0.5 | 0.5 | 0.5 | 0.5 | 0.5 |
| Thickener | Type | CMC | CMC | CMC | CMC | CMC | PAAm (A) | PAAm (A) | PAAm (A) | PAAm (A) | PAAm (A) |
| | Blending amount [parts by mass] | 1.5 | 1.5 | 1.5 | 1.5 | 1.5 | 1.5 | 1.5 | 1.5 | 1.5 | 1.5 |
| Wetting agent | Type | EO/PO | EO/PO | EO/PO | EO/PO | EO/PO | EO/PO | EO/PO | EO/PO | EO/PO | EO/PO |
| | Blending amount [parts by mass] | 0.2 | 0.2 | 0.2 | 0.2 | 0.2 | 0.2 | 0.2 | 0.2 | 0.2 | 0.2 |
| Evaluation | Redispersibility | A | A | A | B | B | AA | AA | AA | A | A |
| | Peel strength | A | A | A | B | B | A | A | A | B | B |
| | Moisture amount | A | A | A | B | A | A | A | A | B | A |
| | Cycle characteristics | A | A | A | B | B | A | A | A | B | B |

TABLE 2

| | | Example 11 | Example 12 | Example 13 | Example 14 | Example 15 | Example 16 | Example 17 | Comparative Example 1 | Comparative Example 2 |
|---|---|---|---|---|---|---|---|---|---|---|
| Inorganic particle | Type | Modified particle | Modified particle | Modified particle | Modified particle | Modified particle | Modified particle | Modified particle | Aluminum hydroxide particle | α-alumina particle |
| | Water generation amount X near Wmax [mass ppm] | 100 | 100 | 100 | 100 | 100 | 100 | 100 | 30000 or more | 0 |
| | Volume average particle size [μm] | 0.8 | 0.8 | 0.8 | 0.8 | 0.8 | 0.8 | 0.8 | 0.8 | 0.8 |
| | Specific surface area [m²/g] | 6.4 | 6.4 | 6.4 | 6.4 | 6.4 | 6.4 | 6.4 | 6.7 | 6.4 |
| | Blending amount [parts by mass] | 100 | 100 | 100 | 100 | 100 | 100 | 100 | 100 | 100 |
| | Proportion in total solid content [mass %] | 92 | 92 | 92 | 92 | 92 | 92 | 92 | 92 | 92 |
| Particulate binder | Type | ACL | ACL | ACL | ACL | ACL | ACL | ACL | ACL | ACL |
| | Composition [mass %] BA | 93.8 | 93.8 | 93.8 | 93.8 | 93.8 | 93.8 | 93.8 | 93.8 | 93.8 |
| | AN | 2 | 2 | 2 | 2 | 2 | 2 | 2 | 2 | 2 |
| | MAA | 2 | 2 | 2 | 2 | 2 | 2 | 2 | 2 | 2 |
| | AMPS | — | — | — | — | — | — | 1 | — | — |
| | AGE | 1 | 1 | 1 | 1 | 1 | 1 | — | 1 | 1 |
| | NMAAm | 1.2 | 1.2 | 1.2 | 1.2 | 1.2 | 1.2 | 1.2 | 1.2 | 1.2 |
| | Glass transition temperature [°C] | -47 | -47 | -47 | -47 | -47 | -47 | -48 | -47 | -47 |
| | Volume average particle size [nm] | 350 | 350 | 350 | 350 | 350 | 350 | 320 | 350 | 350 |
| | Blending amount [parts by mass] | 6 | 6 | 6 | 6 | 6 | 6 | 6 | 6 | 6 |
| Dispersant (water soluble polymer) | Type | AA/SA | AA/SA | AA/SA | AA/SA | AA/MA | LPAA | AA/SA | AA/SA | AA/SA |
| | Ratio of sulfonate group monomer/carboxylic acid group monomer [—] | 0.25 | 0.25 | 0.25 | 0.25 | — | — | 0.25 | 0.25 | 0.25 |
| | Weight average molecular weight [—] | 6000 | 6000 | 6000 | 6000 | 6000 | 6000 | 6000 | 6000 | 6000 |
| | Blending amount [parts by mass] | 0.5 | 0.5 | 0.5 | 0.5 | 0.5 | 0.5 | 0.5 | 0.5 | 0.5 |
| Thickener | Type | PAAm (B) | CMC/PAAm(A) | HPAA | PVA | PAAm (A) | PAAm (A) | PAAm (A) | CMC | CMC |
| | Blending amount [parts by mass] | 1.5 | 1.5 | 1.5 | 1.5 | 1.5 | 1.5 | 1.5 | 1.5 | 1.5 |
| Wetting agent | Type | EO/PO | EO/PO | EO/PO | EO/PO | EO/PO | EO/PO | EO/PO | EO/PO | EO/PO |
| | Blending amount [parts by mass] | 0.2 | 0.2 | 0.2 | 0.2 | 0.2 | 0.2 | 0.2 | 0.2 | 0.2 |
| Evaluation | Redispersibility | A | A | A | A | A | A | A | D | C |
| | Peel strength | A | A | A | A | A | A | A | C | C |
| | Moisture amount | A | A | B | B | A | A | A | C | A |
| | Cycle characteristics | A | A | A | A | A | A | A | C | C |

It can be seen from Examples 1 to 17 and Comparative Examples 1 and 2 of Tables 1 and 2 that a composition for a porous membrane having an excellent redispersibility, a porous membrane having an excellent peel strength, and a second battery with an imported moisture amount reduced and having an excellent cycle characteristics can be obtained by Examples 1 to 17. Further, it can be seen from Examples 1 and 3 to 5 that, the redispersibility of a composition for a porous membrane, the peel strength of porous membrane, and cycle characteristics of a secondary battery can be further improved by adjusting the moisture generation amount X near $W_{max}$, and the moisture amount imported into the secondary battery can be further reduced. Furthermore, it can be seen from Examples 1 to 14 that the redispersibility of the composition for a porous membrane can be further improved, and the moisture amount imported to the secondary battery can be further reduced by changing the type of thickener. Moreover, it can be seen from Examples 6, 15 and 16 that the redispersibility of the composition for a porous membrane can be further improved by changing the type of dispersant.

INDUSTRIAL APPLICABILITY

According to the present disclosure, a composition for a secondary battery porous membrane having an excellent redispersibility can be provided.

Furthermore, according to the present disclosure, a porous membrane for a secondary battery that has an excellent peeling strength and allows a secondary battery to exhibit excellent cycle characteristics can be provided.

According to the present disclosure, a secondary battery having excellent cycle characteristics can be provided.

REFERENCE SIGNS LIST

2 Stirring apparatus
4 Lower face of storage container
6 Upper face of storage container
8 Storage container
10 Axis line of storage container
12 Horizontal axis
14 Motor
16 Rotating shaft for rotating storage container
18 Holder for storage container

The invention claimed is:

1. A composition for a secondary battery porous membrane containing α-alumina-based modified particles, a particulate binder and water, wherein each of the α-alumina-based modified particles has a peak in a region from 3500 cm$^{-1}$ to 3600 cm$^{-1}$ in an infrared diffuse reflectance spectrometry.

2. The composition for a secondary battery porous membrane according to claim 1, wherein a moisture generation rate curve obtained by performing an evolved gas mass spectrometry of the α-alumina-based modified particles under conditions of α-alumina-based modified particle mass of 20 mg; a temperature rising rate of 20° C./minute; and a measurement temperature range from 20° C. to 1000° C. has a maximum value $W_{max}$ of a moisture generation rate in a range from at least 200° C. to no higher than 260° C., and moisture generation amount X near $W_{max}$ calculated from a region surrounded by a baseline connecting a point of 200° C. and a point of 260° C. on the moisture generation rate curve and the moisture generation rate curve is at least 15 mass ppm and no greater than 18000 mass ppm.

3. The composition for a secondary battery porous membrane according to claim 1, wherein a specific surface area of each α-alumina-based modified particles is at least 1 m$^2$/g and no greater than 20 m$^2$/g.

4. The composition for a secondary battery porous membrane according to claim 1, wherein a proportion of the α-alumina-based modified particles in a total solid content is at least 50 mass %.

5. The composition for a secondary battery porous membrane according to claim 1, wherein the particulate binder contains an acid group-containing monomer unit.

6. The composition for a secondary battery porous membrane according to claim 1, wherein the particulate binder contains a cross-linkage monomer unit.

7. The composition for a secondary battery porous membrane according to claim 1, further containing a dispersant.

8. The composition for a secondary battery porous membrane according to claim 1, further containing a thickener.

9. The composition for a secondary battery porous membrane according to claim 1, further containing a wetting agent.

* * * * *